(12) United States Patent
Chae et al.

(10) Patent No.: US 9,160,500 B2
(45) Date of Patent: Oct. 13, 2015

(54) APPARATUS AND METHOD FOR TRANSMITTING AND RECEIVING RESOURCE ALLOCATION INFORMATION IN A COMMUNICATION SYSTEM

(75) Inventors: Seong-Hyeon Chae, Seongnam-si (KR); Hee-Won Kang, Seongnam-si (KR); Jae-Jeong Shim, Seongnam-si (KR); Tae-Young Kim, Seongnam-si (KR); Young-Bo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 12/971,461

(22) Filed: Dec. 17, 2010

(65) Prior Publication Data

US 2011/0150108 A1     Jun. 23, 2011

(30) Foreign Application Priority Data

Dec. 22, 2009  (KR) .................. 10-2009-0129360
Jul. 30, 2010  (KR) .................. 10-2010-0074201

(51) Int. Cl.
*H04L 5/00* (2006.01)
*H04W 48/12* (2009.01)
*H04W 72/04* (2009.01)
*H04W 88/08* (2009.01)

(52) U.S. Cl.
CPC ............ *H04L 5/0007* (2013.01); *H04L 5/0067* (2013.01); *H04L 5/0092* (2013.01); *H04L 5/0094* (2013.01); *H04W 48/12* (2013.01); *H04W 72/042* (2013.01); *H04W 72/0413* (2013.01); *H04W 88/08* (2013.01)

(58) Field of Classification Search
CPC ... H04L 5/0007; H04L 5/0067; H04L 5/0094; H04W 72/0413; H04W 72/042
USPC .................. 370/203–209, 503–522; 375/259; 455/509
See application file for complete search history.

(56) References Cited

U.S. PATENT DOCUMENTS

2012/0155367 A1*  6/2012  Kim et al. ............... 370/312
2012/0207073 A1*  8/2012  Kim et al. ............... 370/311

FOREIGN PATENT DOCUMENTS

KR    10-2009-0039581 A    4/2009
KR    10-2009-0044685 A    5/2009

OTHER PUBLICATIONS

K. Josiam et al., Proposed Text for Section 16.9.3.1 E-MBS Configuration Indicators, IEEE 802.16 Broadband Wireless Access Working Group, IEEE C802.16m-09/2779r1, Jan. 14, 2009.

(Continued)

Primary Examiner — Xavier S. Wong
(74) Attorney, Agent, or Firm — Jefferson IP Law, LLP

(57) ABSTRACT

A method and apparatus for transmitting and receiving resource allocation information in a communication system are provided, in which a Base Station (BS) transmits resource allocation information including a folding bitmap and a Zone Flag (ZF). The folding bitmap provides zone configuration information about zones included in a subframe and the ZF indicates whether a last zone of the zones is allocated as a first service zone or a second service zone. The first service zone carries data for a first service, the second service zone carries data for a second service, and each of the first and second services zones includes at least one resource unit.

24 Claims, 12 Drawing Sheets

(56) References Cited

OTHER PUBLICATIONS

R. Srinivasan et al., IEEE 802.16m System Description Document(SDD), IEEE 802.16 Broadband Wireless Access Working Group, IEEE 802.16m-09/0034, Jul. 27, 2009.

Josiam et al.; "Proposed Text for Section 15.3.9.4 E-MBS Configuration Indicators"; IEEE 802.16 Broadband Wireless Access Working Group, Nov. 17, 2009.

* cited by examiner

APPARATUS AND METHOD FOR TRANSMITTING AND RECEIVING RESOURCE ALLOCATION INFORMATION IN A COMMUNICATION SYSTEM

PRIORITY

This application claims the benefit under 35 U.S.C. §119(a) of a Korean patent application filed in the Korean Intellectual Property Office on Dec. 22, 2009 and assigned Serial No. 10-2009-0129360 and Korean Patent Application filed in the Korean Intellectual Property Office on Jul. 30, 2010 and assigned Serial No. 10-2010-0074201, the entire disclosure of each of which is hereby incorporated by reference.

BACKGROUND OF THE INVENTION

1. Field of the Invention

The present invention relates to an apparatus and method for transmitting and receiving resource allocation information in a communication system.

2. Description of the Related Art

Future-generation communication systems are under development to provide various high-speed, large-capacity services to Mobile Stations (MSs). An example of a future-generation communication system includes an Institute of Electrical and Electronic Engineers (IEEE) 802.16m communication system.

With reference to FIG. 1, a method for transmitting resource allocation information in an IEEE 802.16m system will be described below.

FIG. 1 illustrates a subframe structure in an IEEE 802.16m communication system according to the related art.

Before describing FIG. 1, a description will first be given of a frame structure in the IEEE 802.16m communication system.

In the IEEE 802.16m communication system, a superframe includes a predefined number of frames, each frame having a predefined number of subframes. Each of the subframes includes a predefined number of Orthogonal Frequency Division Multiple Access (OFDMA) symbols. The numbers of DownLink (DL) frames and UpLink (UL) frames in a superframe are determined according to a predefined DL-to-UL ratio. The number of frames per superframe, the number of subframes per frame, the number of OFDMA symbols per subframe, and the ratio between DL frames and UL frames in a superframe may be changed.

Resource allocation is performed with the resources of each subframe in the IEEE 802.16m communication system. The resources of each subframe are allocated on a unit basis, for example, on a Resource Block (RB) basis. Upon completion of an allocation of the resources of a subframe, resource allocation information specifying the allocated resources is transmitted in the subframe. The allocated resources include at least one RB and the resource allocation information is delivered in, for example, a MAP message, which will be described with reference to FIG. 1.

Referring to FIG. 1, it is assumed that one DL subframe is allocated to, for example, four MSs, MS #1 to MS #4. For convenience in description, resources allocated to MS #1 are referred to as MS #1 resources, resources allocated to MS #2 are referred to as MS #2 resources, resources allocated to MS #3 are referred to as MS #3 resources, and resources allocated to MS #4 are referred to as MS #4 resources. Resource allocation information about the MS #1 resources is transmitted in an MS #1 MAP message, resource allocation information about the MS #2 resources is transmitted in an MS #2 MAP message, resource allocation information about the MS #3 resources is transmitted in an MS #3 MAP message, and resource allocation information about the MS #4 resources is transmitted in an MS #4 MAP message. The MS #1 MAP message is a MAP message carrying the resource allocation information about the MS #1 resources, the MS #2 MAP message is a MAP message carrying the resource allocation information about the MS #2 resources, the MS #3 MAP message is a MAP message carrying the resource allocation information about the MS #3 resources, and the MS #4 MAP message is a MAP message carrying the resource allocation information about the MS #4 resources.

To allocate resources as described above, MAP messages are used for resources in a one-to-one correspondence and should carry resource allocation information about the resources. Accordingly, the overhead of transmitting resource allocation information increases with the number of allocated resources, thereby decreasing the overall system performance of the IEEE 802.16m communication system.

Resource allocation can be considered in two ways, individual resource allocation and group resource allocation in the IEEE 802.16m communication system. Depending on individual or group resource allocation, resource allocation information may be represented differently.

In the case of individual resource allocation, four schemes are available to represent resource allocation information, namely a start-end scheme, a start-length scheme, a tree scheme, and a triangle scheme.

The start-end and start-length schemes will first be described below with reference to FIG. 2.

FIG. 2 illustrates start-end and start-length schemes used to represent resource allocation information in an IEEE 802.16m communication system according to the related art.

Referring to FIG. 2, it is assumed that one subframe includes, for example, 48 RBs, RB #0 to RB #47. The start-end scheme specifies resource allocation information using a start position index indicating the start position of allocated resources and an end position index indicating the end position of the allocated resources. For example, if the allocated resources include 9 RBs, RB #20 to RB #28, resource allocation information about the allocated resources is specified using a start position index '000000010100' and a last position index '000000011100'. Given 48 RBs for a subframe, resource allocation information about allocated resources of the subframe may be represented in 24 bits.

The number of bits used to represent resource allocation information about allocated resources in the start-end scheme may be determined by the following equation, $$\text{Bit Overhead for Start-End Scheme} = 2\lceil \log_2(N_{RB}) \rceil \text{ (Bits)} \quad (1)$$

where Bit overhead for Start-End Scheme denotes the number of bits used to represent resource allocation information in the start-end scheme and $N_{RB}$ denotes the number of RBs included in a subframe.

The start-length scheme specifies resource allocation information using a start position index indicating the start position of allocated resources and a length index indicating the length of the allocated resources. For example, if the allocated resources include 9 RBs, RB #20 to RB #28, resource allocation information about the allocated resources is specified using a start position index '000000010100' and a length index '000000001001'. Given 48 RBs for a subframe, resource allocation information about allocated resources of the subframe may be represented in 24 bits.

The number of bits used to represent resource allocation information about allocated resources in the start-length scheme may be determined by the following equation, $$\text{Bit Overhead for Start-Length Scheme} = 2\lceil \log_2(N_{RB}) \rceil \text{ (Bits)} \quad (2)$$

where Bit Overhead for Start-Length Scheme denotes the number of bits used to represent resource allocation information in the start-length scheme.

With reference to FIG. 3, the tree scheme will be described below.

FIG. 3 illustrates a tree scheme in an IEEE 802.16m communication system according to the related art.

Referring to FIG. 3, it is assumed that a subframe includes, for example, 48 RBs, RB #0 to RB #47. According to the tree scheme, resource allocation information may be represented by node indexes. While the tree scheme reduces bit overhead relative to the start-end scheme and the start-length scheme, it has a decreased freedom of representing resource allocation information. More specifically, resource allocation information can be represented only for resources having a size of a power of 2 and a start position being a multiple of 2 in the tree scheme. For instance, if allocated resources occupy 8 RBs ranging from RB #0 to RB #7, the allocated resources may be indicated by resource allocation information. However, if allocated resources occupy 8 RBs ranging from RB #1 to RB #8, the allocated resources may not be indicated by resource allocation information. Despite the advantage of reduction of bit overhead, therefore, the tree scheme faces a limited resource allocation freedom.

The number of bits used to represent resource allocation information about allocated resources in the tree scheme may be determined by the following equation, $$\text{Bit Overhead for Tree Scheme} = \lceil \log_2(N_{RB}) \rceil + 1 \text{ (Bits)} \quad (3)$$

where Bit Overhead for Tree Scheme denotes the number of bits used to represent resource allocation information in the tree scheme.

With reference to FIG. 4, the triangle scheme will be described below.

FIG. 4 illustrates a triangle scheme in an IEEE 802.16m communication system according to the related art.

Referring to FIG. 4, it is assumed that a subframe includes, for example, 48 RBs, RB #0 to RB #47. The triangle scheme increases the resource allocation freedom by increasing the number of nodes, relative to the tree scheme. Therefore, the triangle scheme has a higher bit overhead than the tree scheme. In FIG. 4, since one subframe includes 48 RBs, the triangle scheme should be able to express a total of 1176 cases. Hence, 11 bits are used to represent resource allocation information. The number of bits used to represent resource allocation information about allocated resources in the triangle scheme may be determined by the following equation, $$\text{Bit Overhead for Triangle Scheme} = \lceil \log_2(N_{RB}(N_{RB}+1)/2) \rceil \text{(Bits)} \quad (4)$$

where Bit Overhead for Triangle Scheme denotes the number of bits used to represent resource allocation information in the triangle scheme.

In the case of group resource allocation, resource allocation information may be represented using a bitmap scheme. The bitmap scheme will be described below with reference to FIG. 5.

FIG. 5 illustrates a bitmap scheme in an IEEE 802.16m communication system according to the related art.

Referring to FIG. 5, it is assumed that a subframe includes, for example, 48 RBs, RB #0 to RB #47. Allocated RBs and non-allocated RBs are indicated in a bitmap. The RBs of the subframe are mapped to bits in a one-to-one correspondence. If an RB is allocated, a bit mapped to the RB is set to, for example, '1'. If the RB is not allocated, the bit mapped to the RB is set to, for example, '0'. If one subframe includes 48 RBs as illustrated in FIG. 5, the bitmap scheme uses 48 bits.

The bitmap scheme may indicate whether a specific RB is allocated or not, but may not distinguish between allocated resources. This means that it is not possible to identify the start and end of allocated resources from a bitmap. Accordingly, the bitmap should be transmitted along with information about the positions of allocated resources and information for distinguishing the allocated resources from other resources in the bitmap scheme, thereby increasing bit overhead.

As described above, the methods for representing resource allocation information in the case of individual resource allocation, that is, the start-end scheme, the start-length scheme, the tree scheme, and the triangle scheme increase bit overhead linearly as the number of allocated resources increases. As a consequence, the overall system performance of the IEEE 802.16m communication system is decreased.

In the case of group resource allocation, resource allocation information may be represented in the form of a bitmap. This bitmap scheme does not increase bit overhead with the number of allocated resources but requires additional transmission of information about the positions of allocated resources and information for distinguishing the allocated resources from other resources, thereby eventually increasing bit overhead and thus decreasing the overall system performance of the IEEE 802.16m communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving resource allocation information in a communication system.

Another aspect of exemplary embodiments of the present invention is to provide an apparatus and method for transmitting and receiving resource allocation information in a manner that minimizes bit overhead in a communication system.

In accordance with an aspect of the present invention, a method for transmitting resource allocation information at a BS in a communication system is provided. In the method, resource allocation information including a folding bitmap and a Zone Flag (ZF) is transmitted. The folding bitmap provides zone configuration information about zones included in a subframe and the ZF indicates whether a last zone of the zones is allocated as a first service zone or a second service zone. The first service zone carries data for a first service, the second service zone carries data for a second service, and each of the first and second services zones includes at least one resource unit.

In accordance with another aspect of the present invention, a method for receiving resource allocation information at an MS in a communication system is provided. In the method, resource allocation information including a folding bitmap and a ZF is received. The folding bitmap provides zone configuration information about zones included in a subframe and the ZF indicates whether a last zone of the zones is allocated as a first service zone or a second service zone. The first service zone carries data for a first service, the second service zone carries data for a second service, and each of the first and second services zones includes at least one resource unit.

In accordance with another aspect of the present invention, a method for transmitting resource allocation information at a BS in a communication system is provided. The method includes, resource allocation information including a folding bitmap and a ZF is transmitted. The folding bitmap provides zone configuration information about zones included in a subframe and the ZF indicates whether a last zone of the zones is allocated as an Enhanced-Multicast and Broadcast Service (E-MBS) zone or a unicast zone. The E-MBS zone carries data for E-MBS, the unicast zone carries data for unicast service, and each of the E-MBS zone and the unicast zone includes at least one Resource Block (RB). If the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

In accordance with another aspect of the present invention, a method for receiving resource allocation information at an MS in a communication system is provided. In the method, resource allocation information including a folding bitmap and a ZF is received. The folding bitmap provides zone configuration information about zones included in a subframe and the ZF indicates whether a last zone of the zones is allocated as an E-MBS zone or a unicast zone. The E-MBS zone carries data for E-MBS, the unicast zone carries data for unicast service, and each of the E-MBS zone and the unicast zone includes at least one RB. If the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

In accordance with another aspect of the present invention, a BS in a communication system is provided. The BS includes a transmitter for transmitting resource allocation information including a folding bitmap and a ZF. The folding bitmap provides zone configuration information about zones included in a subframe and the ZF indicates whether a last zone of the zones is allocated as a first service zone or a second service zone. The first service zone carries data for a first service, the second service zone carries data for a second service, and each of the first and second services zones includes at least one resource unit.

In accordance with another aspect of the present invention, an MS in a communication system is provided. The MS includes a receiver for receiving resource allocation information including a folding bitmap and a ZF. The folding bitmap provides zone configuration information about zones included in a subframe and the ZF indicates whether a last zone of the zones is allocated as a first service zone or a second service zone. The first service zone carries data for a first service, the second service zone carries data for a second service, and each of the first and second services zones includes at least one resource unit.

In accordance with another aspect of the present invention, a BS in a communication system is provided. The BS includes a transmitter for transmitting resource allocation information including a folding bitmap and a ZF. The folding bitmap provides zone configuration information about zones included in a subframe and the ZF indicates whether a last zone of the zones is allocated as an E-MBS zone or a unicast zone. The E-MBS zone carries data for E-MBS, the unicast zone carries data for unicast service, and each of the E-MBS zone and the unicast zone includes at least one RB. If the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

In accordance with a further aspect of the present invention, an MS in a communication system is provided. The MS includes a receiver for receiving resource allocation information including a folding bitmap and a ZF. The folding bitmap provides zone configuration information about zones included in a subframe and the ZF indicates whether a last zone of the zones is allocated as an E-MBS zone or a unicast zone. The E-MBS zone carries data for E-MBS, the unicast zone carries data for unicast service, and each of the E-MBS zone and the unicast zone includes at least one RB. If the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
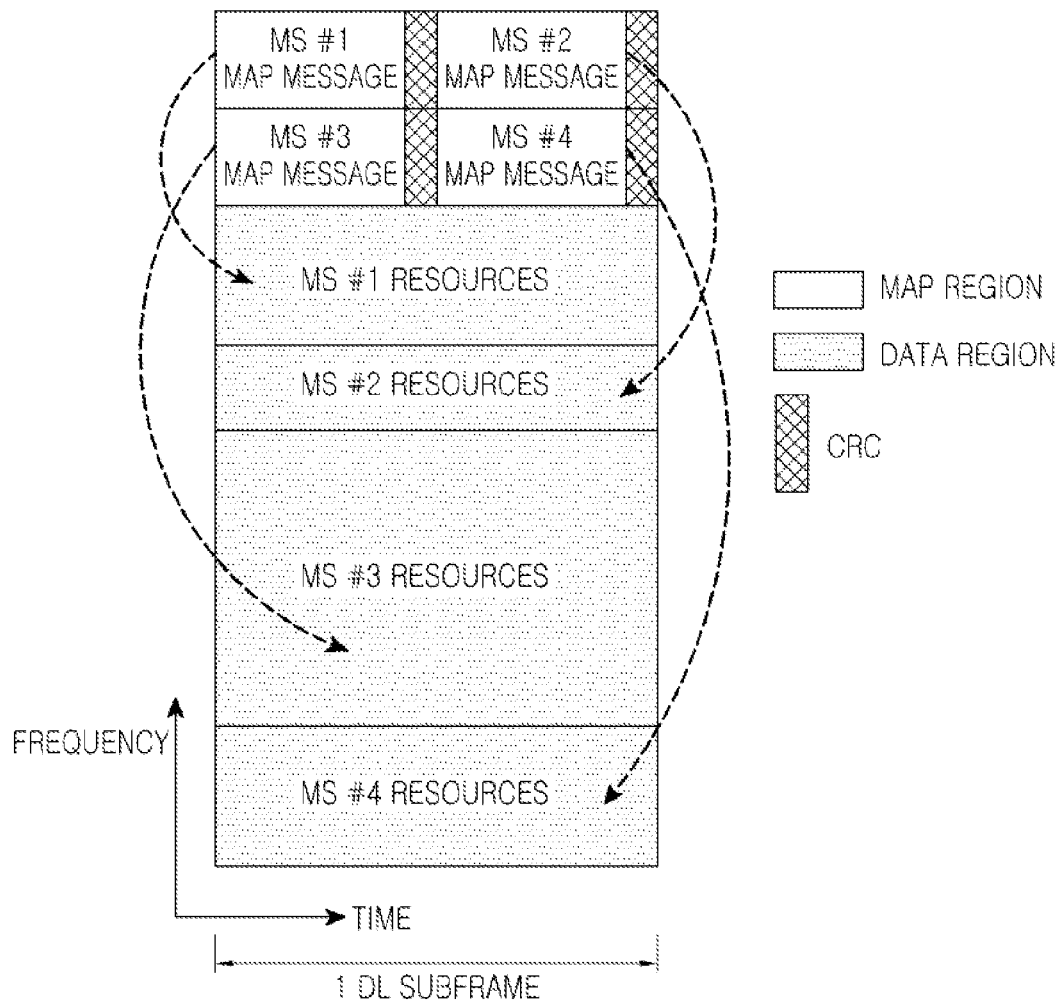
FIG. 1 illustrates a subframe structure in an Institute of Electrical and Electronics Engineers (IEEE) 802.16m communication system according to the related art.
Figure 2:
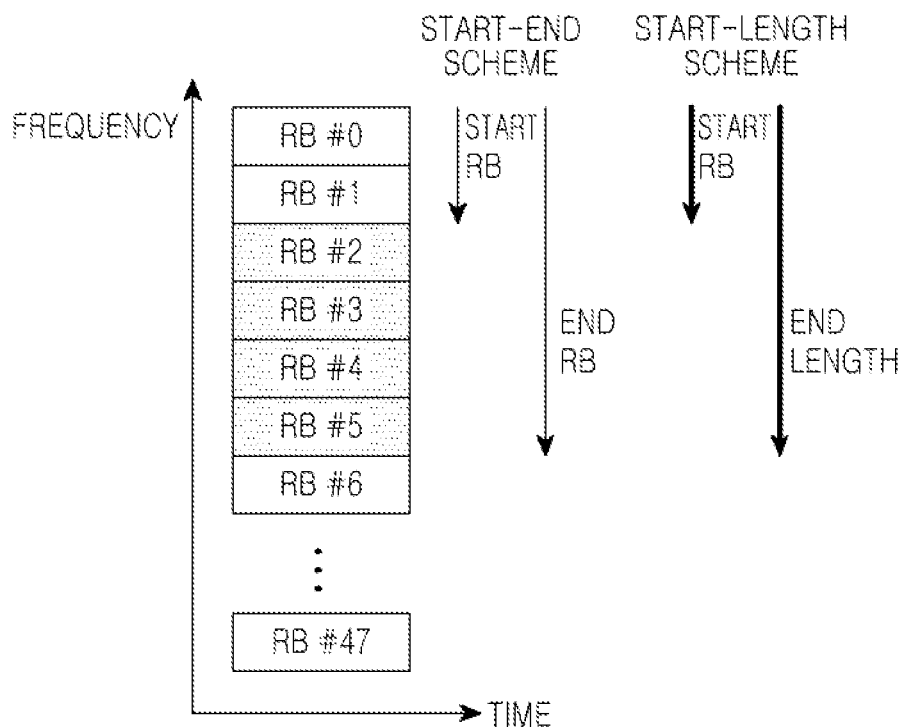
FIG. 2 illustrates a start-end scheme and a start-length scheme in an IEEE 802.16m communication system according to the related art.
Figure 3:
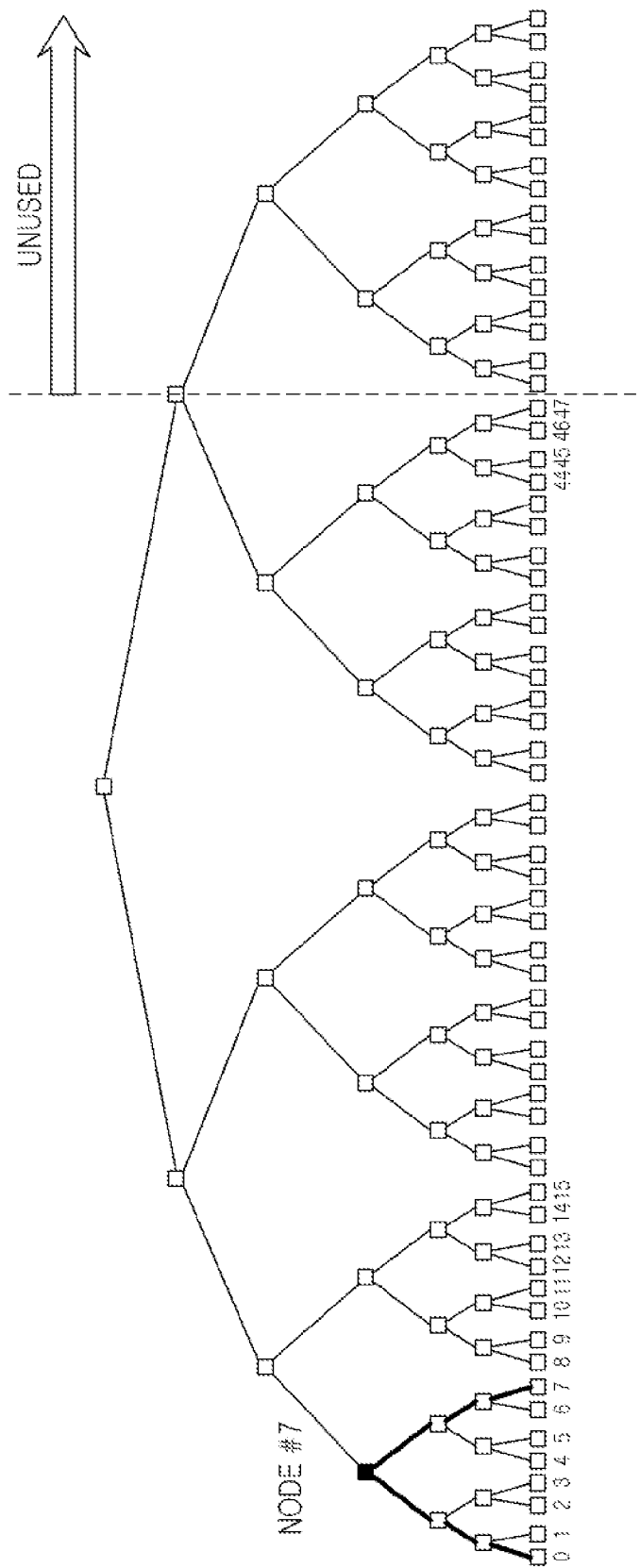
FIG. 3 illustrates a tree scheme in an IEEE 802.16m communication system according to the related art.
Figures 4, 5:
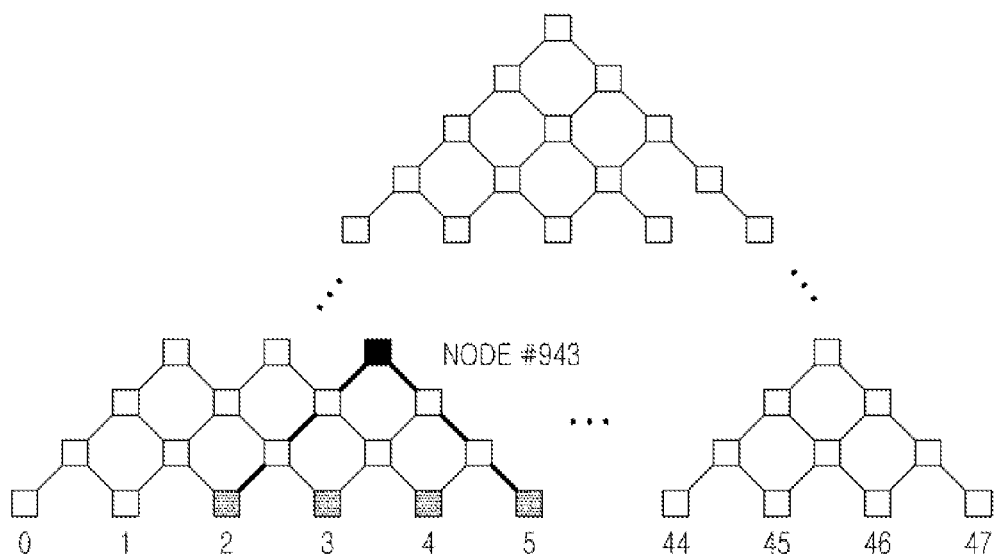
FIG. 4 illustrates a triangle scheme in an IEEE 802.16m communication system according to the related art.
FIG. 5 illustrates a bitmap scheme in an IEEE 802.16m communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention include an apparatus and method for transmitting and receiving resource allocation information in a communication system. More particularly, exemplary embodiments of the present invention include an apparatus and method for transmitting and receiving resource allocation information in a manner that minimizes bit overhead in a communication system. While exemplary embodiments of the present invention will be described in the context of an Institute of Electrical and Electronics Engineers (IEEE) 802.16m communication system as the communication system, the method for transmitting and receiving resource allocation information according to the present invention is applicable to other communication systems.

To transmit and receive resource allocation information with a minimized bit overhead, a folding bitmap is used to represent resource allocation information in an exemplary embodiment of the present invention. In addition, a dual folding bitmap is used to represent resource allocation information in order to transmit and receive resource allocation information with a minimized bit overhead in an exemplary embodiment of the present invention. The folding bitmap and the dual folding bitmap are transmitted, for example, in a Configuration message. Needless to say, other messages such as a MAP message may be used instead of the Configuration message.

Service types supported by the IEEE 802.16m communication system include multicast service and unicast service. An example of a multicast service is an Enhanced-Multicast and Broadcast Service (E-MBS). For convenience in description, a zone allocated for E-MBS is referred to as an 'E-MBS zone' and a zone allocated for unicast service is referred to as a 'unicast zone'. A zone includes at least one resource subunit.

E-MBS zones may be distinguished by Modulation and Coding Scheme (MCS) levels or service IDentifiers (IDs). Apart from MCS levels and service IDs, other criteria may be used to identify E-MBS zones. An E-MBS zone has an E-MBS zone ID.

In the IEEE 802.16m communication system, resource allocation is done based on the resources of each subframe. Let the number of resource units included in a subframe be denoted by $N_{subband}$. The resource units may be Resource Blocks (RBs) or subbands, for example. One subband includes, for example, four RBs. For convenience in description, the resource units are assumed to be subbands.

A description will first be given of a folding bitmap. The folding bitmap is generated using a folding tree which will be described below.

The folding tree includes (M−1) edges. M is the number of subbands allocated for E-MBS zones among all of the subbands of a subframe. The (M−1) edges are connected using M nodes and the first of the M nodes is referred to as a 'start node'.

The folding bitmap includes ($N_{subband}$−1) bits each being set to a bit value generated using the folding tree. A Zone Flag (ZF) is used to indicate whether the last zone of zones included in the subframe is allocated as an E-MBS zone or a unicast zone. In this case, the ZF flag may be 1 bit. The ZF may also be used to indicate whether the first or last zone of zones included in the subframe is allocated as an E-MBS zone or a unicast zone. In this case, the ZF flag may be 2 bits. The ZF will be described later in more detail.

Now a description will be given of methods for generating a folding bitmap with reference to FIGS. 6A to 9B.

Figure 6A:
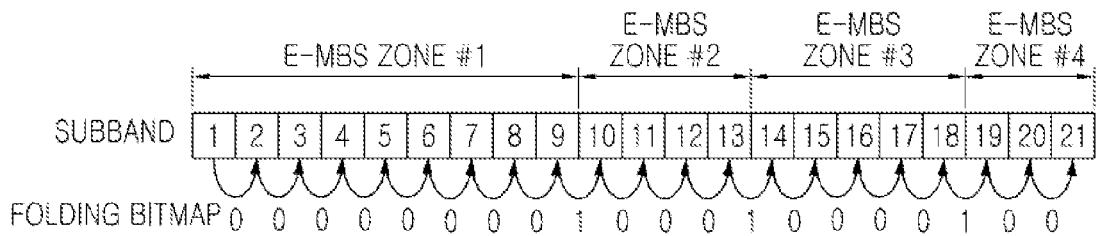
FIGS. 6A and 6B illustrate a method for generating a folding bitmap in an IEEE 802.16m communication system according to an exemplary embodiment of the present invention.
Figure 6B:
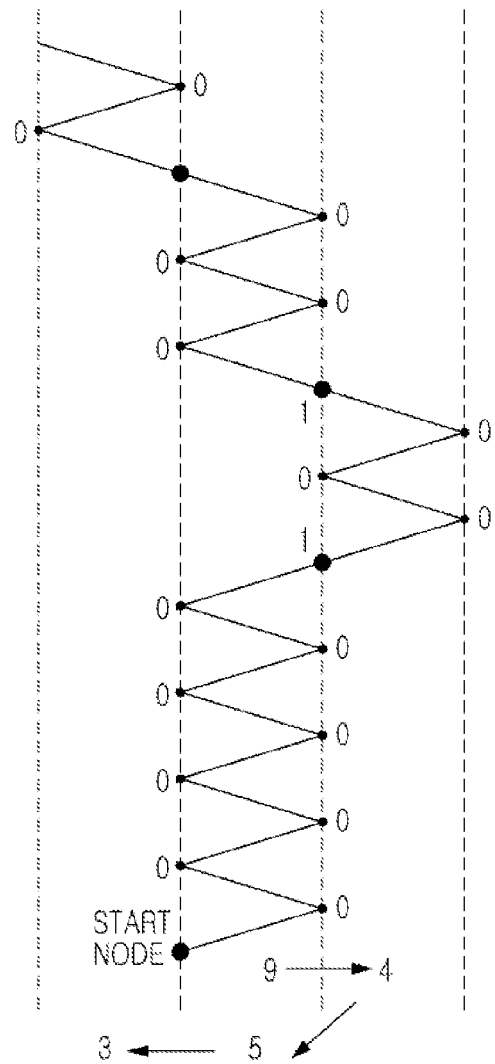

With reference to FIGS. 6A and 6B, a method for generating a folding bitmap when all subbands of a subframe are allocated for E-MBS zones will be described below.

FIGS. 6A and 6B illustrate a method for generating a folding bitmap in an IEEE 802.16m communication system according to an exemplary embodiment of the present invention.

The IEEE 802.16m communication system supports a plurality of channel bandwidths, for example, 5 MHz, 10 MHz and 20 MHz. For convenience in description, it is assumed that the IEEE 802.16m communication system supports 20 MHz. When the IEEE 802.16m communication system supports 20 MHz, a subframe includes 21 subbands and a folding bitmap is 20 bits long.

If the IEEE 802.16m communication system supports 10 MHz, a subframe includes 10 subbands and a folding bitmap is 9 bits long. If the IEEE 802.16m communication system supports 5 MHz, a subframe includes 4 subbands and a folding bitmap is 3 bits long.

The method for generating a folding bitmap illustrated in FIGS. 6A and 6B is based on the assumption that the ZF is not used.

Referring to FIG. 6A, all subbands (i.e., 21 subbands) of a subframe are allocated for E-MBS. More specifically, the 21 subbands are divided into four E-MBS zones, E-MBS zone #1 to E-MBS zone #4. E-MBS zone #1 includes subband #1 to subband #9, E-MBS zone #2 includes subband #10 to subband #13, E-MBS zone #3 includes subband #14 to subband #18, and E-MBS zone #4 includes subband #19, subband #20 and subband #21.

To represent the above allocation of E-MBS zones, a folding bitmap is set to [000000000100010000100]. How the folding bitmap [000000000100010000100] is created will be described with reference to FIG. 6B.

Since all subbands of a subframe are allocated for E-MBS zones, if the E-MBS zone index of a subband with the lowest index, subband #1, is identical to the E-MBS zone index of the next subband, subband #2, at a start node, a Base Station (BS) draws an edge in a 45-degree right upward direction from the start node, sets a bit #1 node corresponding to the first bit (i.e., bit #1) of the single folding bitmap at the end of the edge, and sets the value of the node to, for example, '0'. The start node may be referred to as a bit #0 node. The node value of the bit #1 node is equal to the bit value of bit #1. For convenience in description, the 45-degree right upward direction is referred to as a 'first direction'.

On the other hand, if the E-MBS zone index of subband #1 is different from the E-MBS zone index of subband #2, the BS draws an edge in a 45-degree left upward direction from the start node, sets the bit #1 node at the end of the edge, and sets the value of the node to, for example, '1'. For convenience in description, the 45-degree left upward direction is referred to as a 'second direction'.

Subsequently, if the E-MBS zone index of subband #2 is identical to the E-MBS zone index of subband #3 at the bit #1 node, the BS draws an edge in a direction which is opposite to a direction of a previous edge from the bit #1 node, sets a bit #2 node corresponding to the second bit (i.e., bit #2) of the folding bitmap at the end of the edge, and sets the value of the node to '0'. The node value of the bit #2 node is equal to the value of bit #2 in the folding bitmap.

On the contrary, if the E-MBS zone index of subband #2 is different from that of subband #3, the BS draws an edge in a direction which is identical to the direction of the previous edge from the bit #1 node, sets the bit #2 node at the end of the edge, and sets the value of the node to '1'. The node value of the bit #2 node is equal to the value of bit #2 in the folding bitmap.

As stated before, since the BS allocates all subbands of a subframe for E-MBS zones, if the E-MBS zone index of subband #(m+1) is identical to the E-MBS zone index of subband #m at a bit #m node (m is 0 or a larger integer), the BS draws an edge in the first a direction which is opposite to a direction of a previous edge from the bit #m node, sets a bit #(m+1) node corresponding to an (m+1)th bit of the folding bitmap, that is, bit #(m+1) of the folding bitmap at the edge, and sets the value of the node to '0'. The value of the bit #(m+1) node is equal to the value of bit #(m+1) in the folding bitmap. On the contrary, if the E-MBS zone index of subband #(m+1) is different from the E-MBS zone index of subband #m at the bit #m node, the BS draws an edge in a direction which is identical to the direction of the previous edge from the bit #m node, sets the bit #(m+1) node corresponding to the (m+1)th bit of the folding bitmap, that is, bit #(m+1) of the folding bitmap at the edge, and sets the value of the node to '1'. The value of the bit #(m+1) node is equal to the value of bit #(m+1) in the folding bitmap.

In the case where all subbands of a subframe are allocated for E-MBS zones and a folding bitmap is created using the above-described folding tree scheme, the number of bits included in the folding bitmap may be determined by the following equation, $$\text{Bit Overhead for Single Folding Bitmap Scheme} = N_{subband} - 1 \text{(Bits)} \quad (5)$$

where Bit Overhead for Single Folding Bitmap Scheme denotes the number of bits included in the folding bitmap.

The position of each allocated E-MBS zone may be determined using the folding bitmap. A new E-MBS zone starts from a subband with a subband index larger than the bit index of a bit with value '1' in the folding bitmap by 1. For example, bits #9, #13 and #18 of the folding bitmap have value '1' and thus new E-MBS zones start from subbands #10 (=9+1), #14 (=13+1) and #19 (=18+1), respectively in FIGS. 6A and 6B.

The folding bitmap indicates the total number of E-MBS zones allocated to one subframe as well as the start positions of new E-MBS zones. The total number NE-MBS of E-MBS zones allocated to a subframe is (the number of bits with value '1' in the folding bitmap) plus 1 as may be determined by the following equation, $$N_{E\text{-}MBS} = \text{Total number of bit value '1' in a Single Folding Bitmap} + 1 \quad (6)$$

After generating the folding bitmap as described above with reference to FIGS. 6A and 6B, the BS transmits the folding bitmap in a Configuration message. Then MSs receive the Configuration message and detect the folding bitmap from the Configuration message. The MSs may determine the position of each allocated E-MBS zone and the total number of E-MBS zones allocated to a subframe using the folding bitmap in the manner described above.

While it has been described in FIGS. 6A and 6B that the first and second directions are a 45-degree right upward direction and a 45-degree left upward direction, respectively, the left or right, the upward or downward, and the angle may be changed in setting the first and second directions.

Now a description will be given below of a method for generating a folding bitmap when D subbands, subband #1 to subband #D are not allocated for E-MBS zones and the remaining subbands are allocated for E-MBS zones among subbands included in a subframe, with reference to FIGS. 7A, 7B and 7C.

Figure 7A:
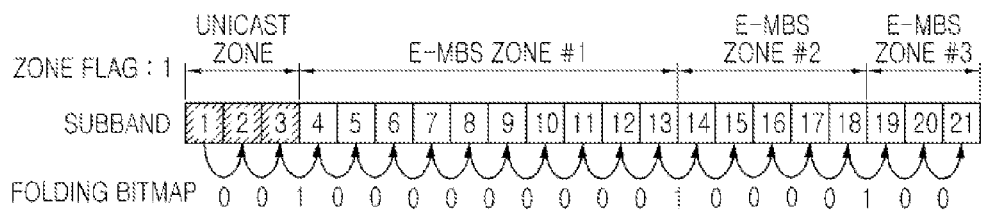
FIGS. 7A, 7B and 7C illustrate a method for generating a folding bitmap in an IEEE 802.16m communication system according to an exemplary embodiment of the present invention.
Figure 7B:
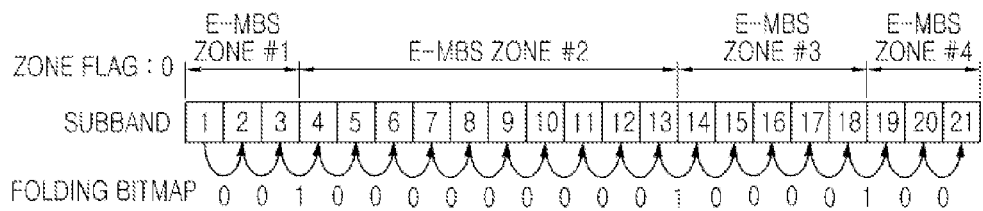
Figure 7C:
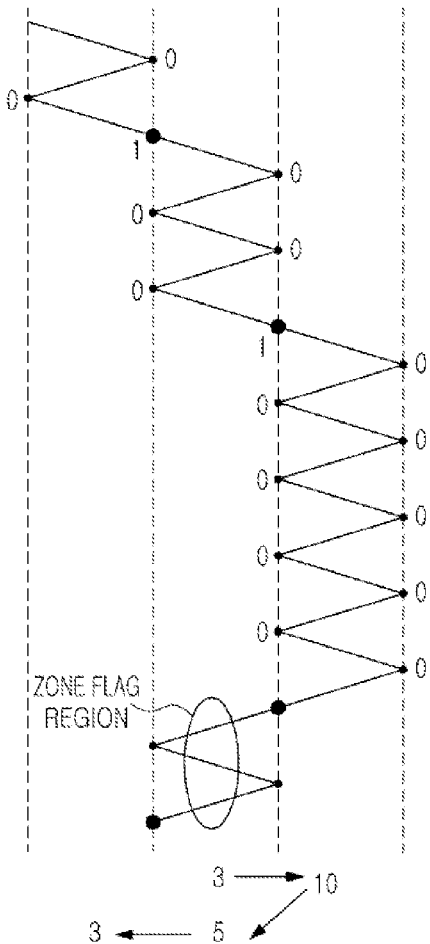

FIGS. 7A, 7B and 7C illustrate a method for generating a folding bitmap in an IEEE 802.16m communication system according to an exemplary embodiment of the present invention.

The folding bitmap generation method illustrated in FIGS. 7A, 7B and 7C is performed on the assumption that a ZF, for example, a 1-bit ZF, is used.

Referring to FIG. 7A, some subbands (i.e., 21 subbands) included in a subframe, in particular, D subbands starting from a subband with the lowest index, subband #1, are not allocated for E-MBS zones. More specifically, subbands ranging from subband #1 to subband #D are allocated for a unicast zone and subbands ranging from subband #(D+1) to subband #$N_{subband}$ are allocated for E-MBS zones.

Referring again to FIG. 7A. a subframe includes three E-MBS zones, E-MBS zone #1, E-MBS zone #2 and E-MBS zone #3. E-MBS zone #1 has subband #4 to subband #13, E-MBS zone #2 has subband #14 to subband #18, and E-MBS zone #3 has subband #19, subband #20 and subband #21. To indicate that subband #1, subband #2 and subband #3 are allocated for a unicast zone and the other subbands are allocated for E-MBS zones, the ZF bit is set to '1'. This indicates that a portion of all of the subbands of a subframe is allocated for an E-MBS zone and the remaining subbands are allocated for a unicast zone.

To represent the above-described allocation of a unicast zone and E-MBS zones in FIG. 7A, a folding bitmap is set to [001000000000010000100]. How the folding bitmap [001000000000010000100] is created will be described below with reference to FIG. 7C.

Since three subbands, subband #1, subband #2 and subband #3 are allocated for a unicast zone, a BS sets the ZF bit to, for example, '1'. Then the BS sets the values of 20 bits in the folding bitmap using the same folding tree scheme described with reference to FIGS. 6A and 6B.

When the BS transmits the ZF bit and the folding bitmap [001000000000010000100] in a Configuration message to MSs, the MSs may be aware that subband #1, subband #2 and subband #3 are allocated for a unicast zone, subband #4 to subband #13 are allocated for E-MBS zone #1, subband #14 to subband #18 are allocated for E-MBS zone #2, and subband #19, subband #20 and subband #21 are allocated for E-MBS zone #3.

FIG. 7B illustrates a case where all subbands (i.e., 21 subbands) of a subframe are allocated for E-MBS zones according to an exemplary embodiment of the present invention.

Referring to FIG. 7B, four E-MBS zones, E-MBS zone #1 to E-MBS zone #4 are defined in a subframe. E-MBS zone #1 includes subband #1, subband #2 and subband #3, E-MBS zone #2 includes subband #4 to subband #13, E-MBS zone #3 includes subband #14 to subband #18, and E-MBS zone #4 includes subband #19, subband #20 and subband #21. To indicate that all subbands, that is, subband #1 to subband #21 are allocated for E-MBS zones, the ZF bit is set to, for example, '0'. This indicates that all subbands of a subframe are allocated for E-MBS zones.

To represent the allocation of E-MBS zones illustrated in FIG. 7B, a folding bitmap is set to [001000000000010000100] in the same manner as the folding bitmap representing the zone allocation illustrated in FIG. 7A.

After generating the folding bitmap, the BS transmits the ZF bit and the folding bitmap in a Configuration message. Then MSs receive the Configuration message and detect the ZF bit and the folding bitmap from the Configuration message. As described before, the MSs can detect the number of subbands allocated for a unicast zone, the position of each allocated E-MBS zone, and the total number of E-MBS zones allocated in a subframe, based on the ZF bit and the folding bitmap.

To use a folding bitmap and a ZF bit as illustrated in FIGS. 7A, 7B and 7C, if some of the subbands of a subframe are allocated for an E-MBS zone and the remaining subbands are allocated for a unicast zone, the unicast zone should start from a subband with the lowest index among all of the subbands, namely subband #1 and the E-MBS zone should follow the unicast zone. It should be assumed that this allocation rule is known to the BS and the MSs in advance.

Figure 8A:
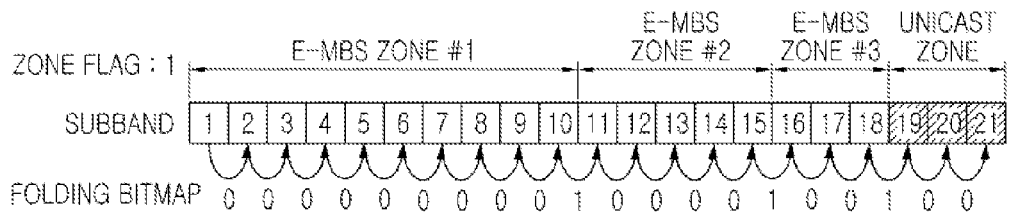
FIGS. 8A, 8B and 8C illustrate a method for generating a folding bitmap in an IEEE 802.16m communication system according to an exemplary embodiment of the present invention.
Figure 8B:
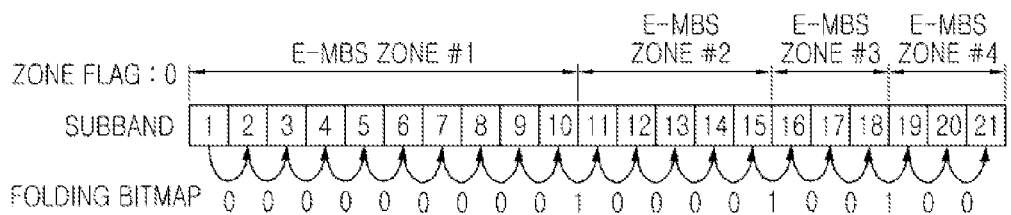
Figure 8C:
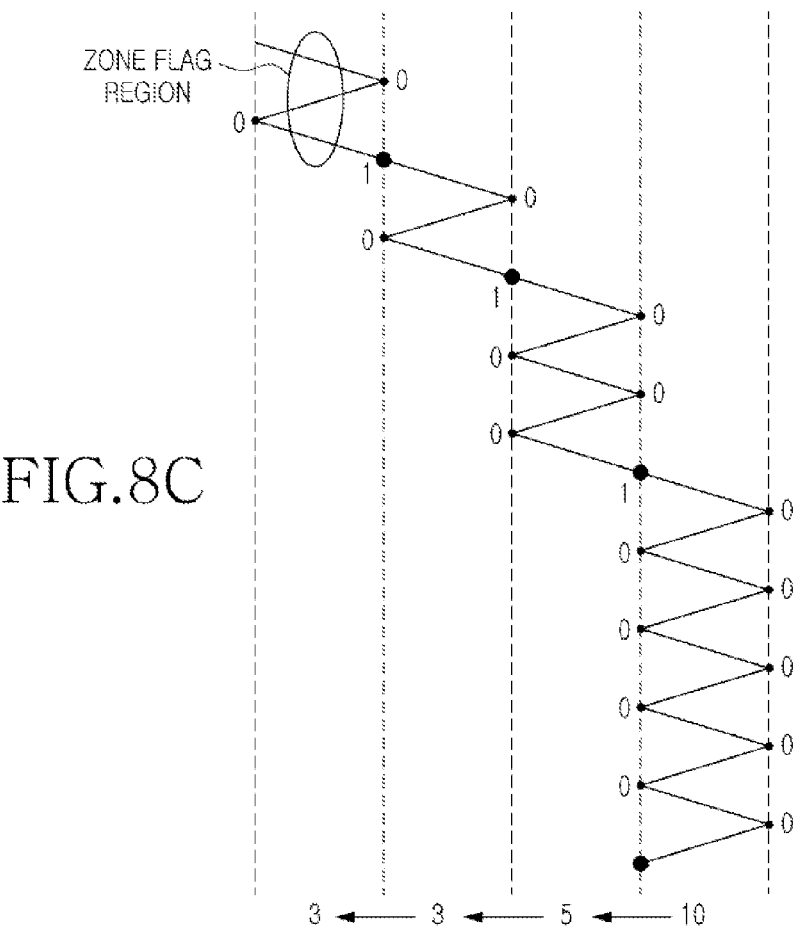

With reference to FIGS. 8A, 8B and 8C, a method for generating a folding bitmap when D subbands ranging from $\#N_{subband}$ to $\#N_{subband}-D$ are allocated for a unicast zone and the remaining subbands are all allocated for E-MBS zones will be described below.

FIGS. 8A, 8B and 8C illustrate a method for generating a folding bitmap in an IEEE 802.16m communication system according to an exemplary embodiment of the present invention.

The folding bitmap generation method illustrated in FIGS. 8A, 8B and 8C is performed on the assumption that a ZF, for example, a 1-bit ZF is used.

FIG. 8A illustrates a case where some subbands (i.e., 21 subbands) included in a subframe, in particular, D subbands starting from a subband with the highest index, subband $\#N_{subband}$, are allocated for a unicast zone. More specifically, subbands ranging from $\#N_{subband}$ to subband $\#N_{subband}-D$ are allocated for a unicast zone and subbands ranging from subband #1 to subband $\#(N_{subband}-D)-1$ are allocated for E-MBS zones.

Referring to FIG. 8A, a subframe includes three E-MBS zones, E-MBS zone #1, E-MBS zone #2 and E-MBS zone #3. E-MBS zone #1 has subband #1 to subband #10, E-MBS zone #2 has subband #11 to subband #15, and E-MBS zone #3 has subband #16, subband #17 and subband #18. Thus, subband #19, subband #20 and subband #21 are allocated for a unicast zone. To indicate that subband #19, subband #20 and subband #21 are allocated for a unicast zone, the ZF field is set to '1'.

To represent the above-described allocation of E-MBS zones in FIG. 8A, a folding bitmap is set to [000000000010000100100]. As illustrated in FIG. 8C, the folding bitmap [000000000010000100100] has been created in the manner described before with reference to FIGS. 6A and 6B.

When the BS transmits the ZF bit set to '1' and the folding bitmap [000000000010000100100] in a Configuration message to MSs, the MSs may be aware that subband #19, subband #20 and subband #21 are allocated for a unicast zone, subband #1 to subband #10 are allocated for E-MBS zone #1, subband #11 to subband #15 are allocated for E-MBS zone #2, and subband #16, subband #17 and subband #18 are allocated for E-MBS zone #3.

FIG. 8B illustrates a case where all subbands (i.e., 21 subbands) of a subframe are allocated for E-MBS zones according to an exemplary embodiment of the present invention. Referring to FIG. 8B, four E-MBS zones, E-MBS zone #1 to E-MBS zone #4 are defined in a subframe. E-MBS zone #1 includes subband #1 to subband #10, E-MBS zone #2 includes subband #11 to subband #15, E-MBS zone #3 includes subband #16, subband #17 and subband #18, and E-MBS zone #4 includes subband #19, subband #20 and subband #21. To indicate that all subbands are allocated for E-MBS zones, the ZF field is set to '1'.

To represent the allocation of E-MBS zones illustrated in FIG. 8B, a folding bitmap is set to [000000000010000100100] in the same manner as the folding bitmap representing the allocation illustrated in FIGS. 6A, 6B and 6C, as illustrated in FIG. 8C.

When the BS transmits the ZF bit set to '1' and the folding bitmap [000000000010000100100] in a Configuration message, MSs are aware from the Configuration message that subband #1 to subband #10 are allocated for E-MBS zone #1, subband #11 to subband #15 are allocated for E-MBS zone #2, subband #16, subband #17 and subband #18 are allocated for E-MBS zone #3, and subband #19, subband #20 and subband #21 are allocated for E-MBS zone #4.

To use a folding bitmap and a ZF bit as illustrated in FIGS. 8A, 8B and 8C, if some of the subbands of a subframe are allocated for an E-MBS zone and the remaining subbands are allocated for a unicast zone, the unicast zone should start from a subband with the highest index among all of the subbands, namely subband $\#N_{subband}$ and the E-MBS zone should follow the unicast zone. It should be assumed that this allocation rule is known to the BS and the MSs in advance.

Figure 9A:
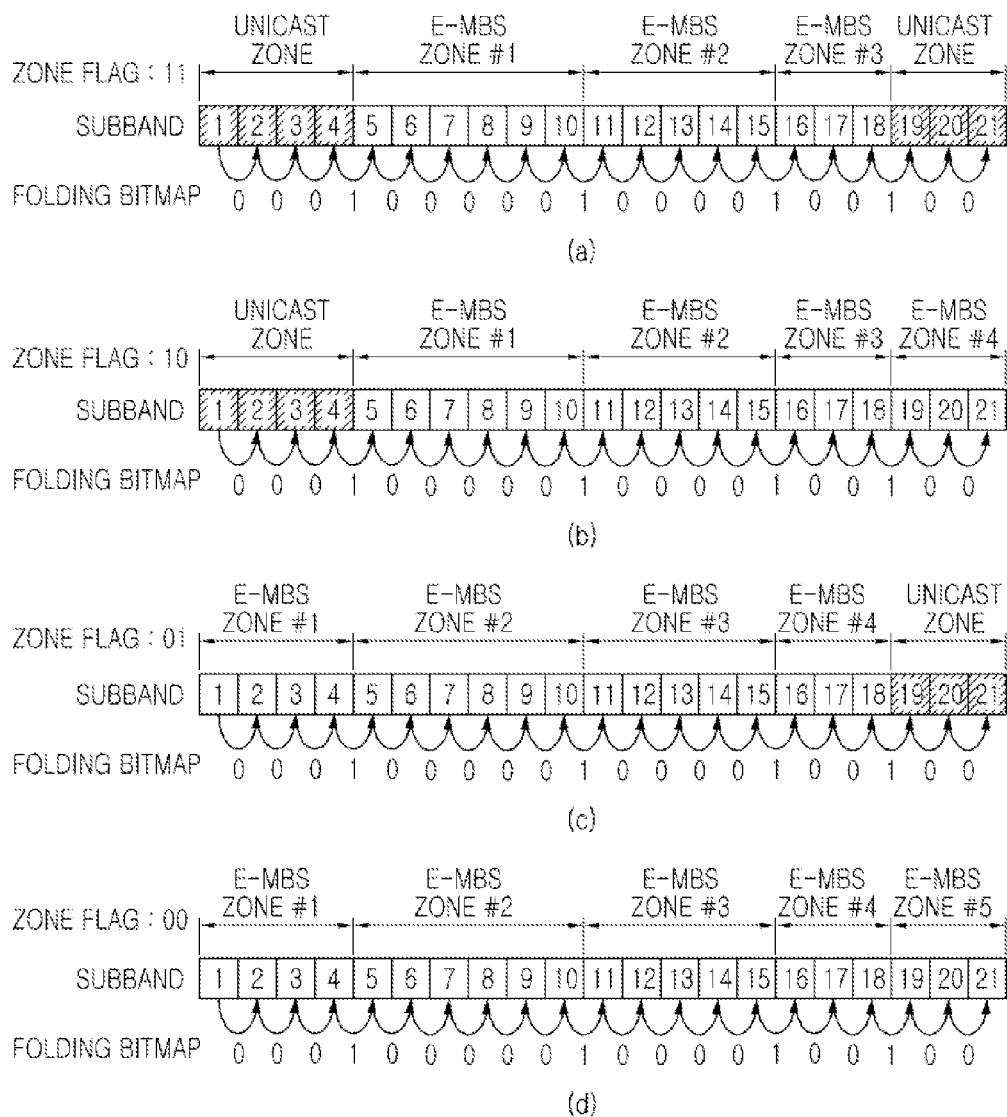
FIGS. 9A and 9B illustrate a method for generating a folding bitmap in an IEEE 802.16m communication system according to an exemplary embodiment of the present invention.
Figure 9B:
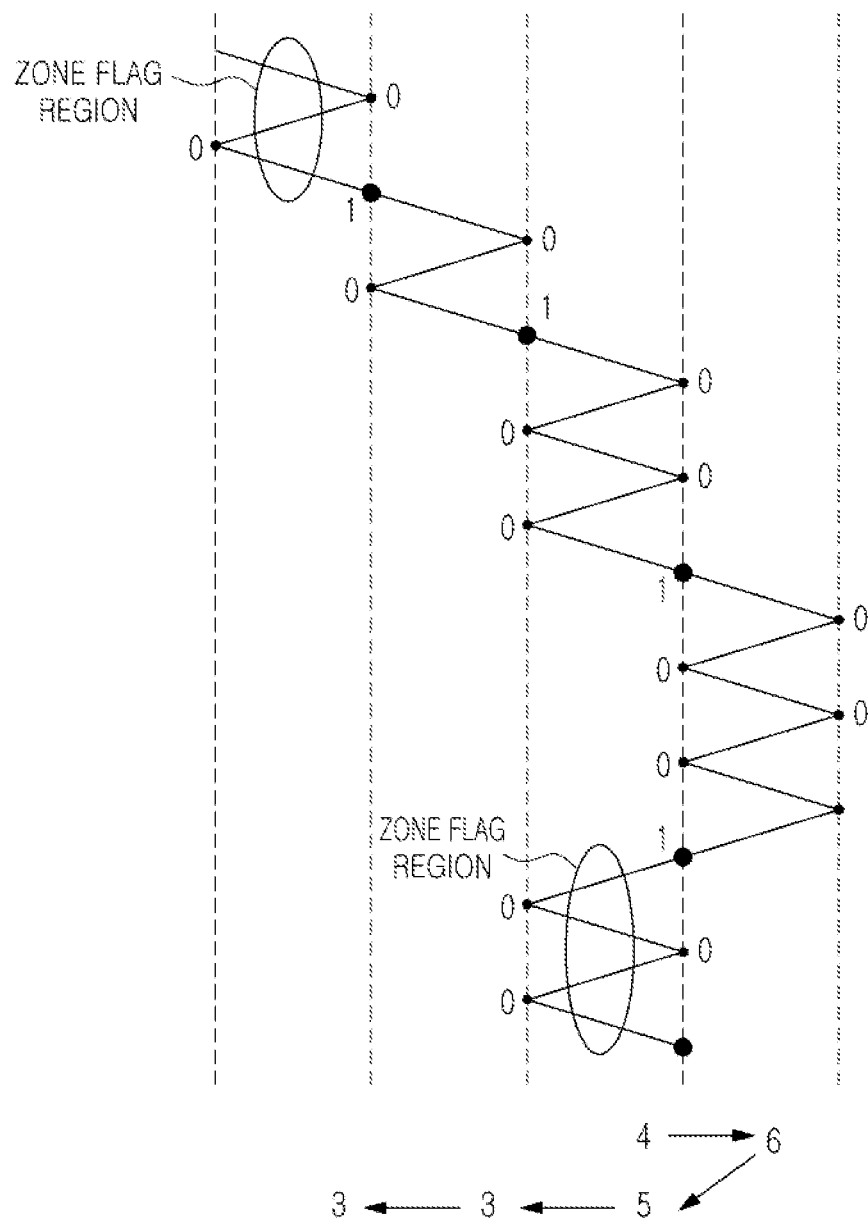

With reference to FIGS. 9A and 9B, a description will be given of a method for generating a folding bitmap when D1 subbands ranging from subband #1 to subband #D1 and D2 subbands ranging from subband #$N_{subband}$ to subband #$N_{subband}$-D2 among the subbands of a subframe are allocated for unicast zones and the other subbands are allocated for E-MBS zones, when D1 subbands ranging from subband #1 to subband #D1 are allocated for a unicast zone and the other subbands are allocated for E-MBS zones, or when D2 subbands ranging from subband #$N_{subband}$ to subband # $N_{subband}$-D2 are allocated for unicast zones and the other subbands are allocated for E-MBS zones. Herein D=D1+D2.

FIGS. 9A and 9B illustrate a method for generating a folding bitmap in an IEEE 802.16m communication system according to an exemplary embodiment of the present invention.

The folding bitmap generation method is based on the premise that a 2-bit ZF is used.

Referring to FIGS. 9A and 9B, (a) of FIG. 9A illustrates a case where D1 subbands ranging from subband #1 to subband #D1 and D2 subbands ranging from subband #$N_{subband}$ to subband # $N_{subband}$-D2 among the subbands of a subframe are allocated for unicast zones and the other subbands are allocated for E-MBS zones. Here, D1 is 4 and D2 is 3.

In (a) of FIG. 9A, a subframe includes three E-MBS zones, E-MBS zone #1, E-MBS zone #2 and E-MBS zone #3. E-MBS zone #1 includes subband #5 to subband #10, E-MBS zone #2 includes subband #11 to subband #15, and E-MBS zone #3 includes subband #16, subband #17 and subband #18. Therefore, the ZF is set to '11' to indicate that subband #1 to subband #4 and subband #19 to subband #21 are allocated for unicast zones and the other subbands are allocated for E-MBS zones. In the case of a 2-bit ZF, if the ZF is set to '11', this indicates that D1 subbands ranging from subband #1 to subband #D1 and D2 subbands ranging from subband #$N_{subband}$ to subband # $N_{subband}$-D2 among the subbands of a subframe are allocated for unicast zones and the other subbands are allocated for E-MBS zones. If the ZF is set to '10', this indicates that D1 subbands ranging from subband #1 to subband #D1 are allocated for a unicast zone and the other subbands are allocated for E-MBS zones. If the ZF is set to '01', this indicates that D2 subbands ranging from subband #$N_{subband}$ to subband # $N_{subband}$-D2 are allocated for a unicast zone and the other subbands are allocated for E-MBS zones. If the ZF is set to '00', this indicates that all subbands of a subframe are allocated for E-MBS zones.

To represent the allocation of unicast zones and E-MBS zones illustrated in (a) of FIG. 9A, a folding bitmap is set to [000100000100000100100] in the same manner as described before with reference to FIGS. 6A and 6B, as illustrated in FIG. 9B.

In (b) of FIG. 9A, a subframe includes four E-MBS zones, E-MBS zone #1 to E-MBS zone #4. E-MBS zone #1 includes subband #5 to subband #10, E-MBS zone #2 includes subband #11 to subband #15, E-MBS zone #3 includes subband #16, subband #17 and subband #18, and E-MBS zone #4 includes subband #19, subband #20 and subband #21. Therefore, the ZF is set to '10' to indicate that subband #1 to subband #4 are allocated for a unicast zone and the other subbands are allocated for E-MBS zones.

To represent the allocation of unicast zones and E-MBS zones illustrated in (b) of FIG. 9A, a folding bitmap is set to [000100000100000100100] in the same manner as described before with reference to FIGS. 6A and 6B, as illustrated in FIG. 9B.

In (c) of FIG. 9A, a subframe includes four E-MBS zones, E-MBS zone #1 to E-MBS zone #4. E-MBS zone #1 includes subband #1 to subband #4, E-MBS zone #2 includes subband #5 to subband #10, E-MBS zone #3 includes subband #11 to subband #15, and E-MBS zone #4 includes subband #16, subband #17 and subband #18. Therefore, the ZF is set to '01' to indicate that subband #19, subband #20 and subband #21 are allocated for a unicast zone and the other subbands are allocated for E-MBS zones.

To represent the allocation of unicast zones and E-MBS zones illustrated in (c) of FIG. 9A, a folding bitmap is set to [000100000100000100100] in the same manner as described before with reference to FIGS. 6A and 6B, as illustrated in FIG. 9B.

In (d) of FIG. 9A, a subframe includes five E-MBS zones, E-MBS zone #1 to E-MBS zone #5. E-MBS zone #1 includes subband #1 to subband #4, E-MBS zone #2 includes subband #5 to subband #10, E-MBS zone #3 includes subband #11 to subband #15, E-MBS zone #4 includes subband #16, subband #17 and subband #18, and E-MBS zone #5 includes subband #19, subband #20 and subband #21. Therefore, the ZF is set to '00' to indicate that all subbands (i.e., 21 subbands) of a subframe are allocated for E-MBS zones.

To represent the allocation of unicast zones and E-MBS zones illustrated in (d) of FIG. 9A, a folding bitmap is set to [000100000100000100100] in the same manner as described before with reference to FIGS. 6A and 6B, as illustrated in FIG. 9B.

In the case where resource allocation information is transmitted only in a folding bitmap without using a ZF as described before, a MAP message including the folding bitmap may have the format shown below in Table 1.

TABLE 1

| Syntax | Size in bits | Description/Notes |
| --- | --- | --- |
| E-MBS Configuration( ) | 4 | |
| E-MBS Zone ID | 7 | The E-MBS zone ID to which this E-MBS Configuration applies. |
| MBS Scheduling Interval (MSI) Length | TBD | |
| Folding Bitmap For(Number_of_E-MBS zones) | 10 | |
| ... | | |
| $I_{size\text{-}offset}$ | 5 | Depends on supported modes, 32 modes assumed as baseline. |
| ... | | |
| Padding | variable | |

Referring to Table 1, E-MBS Configuration indicates that this is a Configuration message for E-MBS, E-MBS Zone ID indicates the ID of an E-MBS zone to which the E-MBS Configuration message applies, MSI Length specifies the length of an MBS scheduling interval, Folding Bitmap indicates a folding bitmap, $I_{size\text{-}offset}$ specifies the size of a burst transmitted in an E-MBS zone, and Padding indicates padding bits. The format of a Configuration message illustrated in Table 1 is for a case where one E-MBS zone can include up to 10 subbands.

In the case where resource allocation information is transmitted using a folding bitmap and a 2-bit ZF, a Configuration message including the folding bitmap and the 2-bit ZF may have the format shown below in Table 2.

TABLE 2

| Syntax | Size in bits | Description/Notes |
|---|---|---|
| E-MBS Configuration ( ) | | |
| E-MBS Zone ID | 4 7 | The E-MBS zone ID to which this E-MBS Configuration applies. |
| MSI Length | TBD | |
| Folding Bitmap | 10 | |
| ZF (Zone Flag) | 2 | 00: E-MBS zones occupy all subbands. 01: The last zone is not occupied by E-MBS service. 10: The first zone is not occupied by E-MBS service. 11: Both the first and the last zone are not occupied by E-MBS service. |
| For(Number_of_E-MBS zones) ... | | |
| $I_{size\text{-}offset}$ | 5 | Depends on supported modes, 32 modes assumed as baseline. |
| ... | | |
| Padding | variable | |

The format of a Configuration message illustrated in Table 2 is also for a case where one E-MBS zone can include up to 10 subbands.

Table 3 compares the resource allocation information representation scheme of an exemplary embodiment of the present invention is compared with the conventional triangle scheme in the IEEE 802.16m communication system.

TABLE 3

| BW | The number of E-MBS zones | Triangle | Folding Bit-MAP |
|---|---|---|---|
| 20 MHz | 1 | 12 Bits | 20 Bits |
| | 2 | 20 Bits | |
| | 3 | 28 Bits | |
| | 4 | 36 Bits | |
| 10 MHz | 1 | 9 Bits | 9 Bits |
| | 2 | 12 Bits | |
| | 3 | 21 Bits | |
| | 4 | 27 Bits | |
| 5 MHz | 1 | 6 Bits | 3 Bits |
| | 2 | 10 Bits | |
| | 3 | 12 Bits | |
| | 4 | 18 Bits | |

As noted from Table 3, the resource allocation information representation scheme of an exemplary embodiment of the present invention is more effective, as the IEEE 802.16m communication system uses a narrower bandwidth, the total number of available subbands is smaller, and more subbands are allocated. For example, as the bandwidth is narrower, bit overhead is decreased more in an exemplary embodiment of the present invention than in the triangle scheme. In practice, when the number of E-MBS zones exceeds 3 at 20 MHz, an exemplary embodiment of the present invention is more effective. At 5 MHz, an exemplary embodiment of the present invention performs well irrespective of the number of E-MBS zones. In the triangle scheme, the bit overhead, i.e., the number of bits used to represent the number of E-MBS zones is 4 bits at 20 MHz, 3 bits at 10 MHz and 2 bits at 5 MHz.

Figure 10:
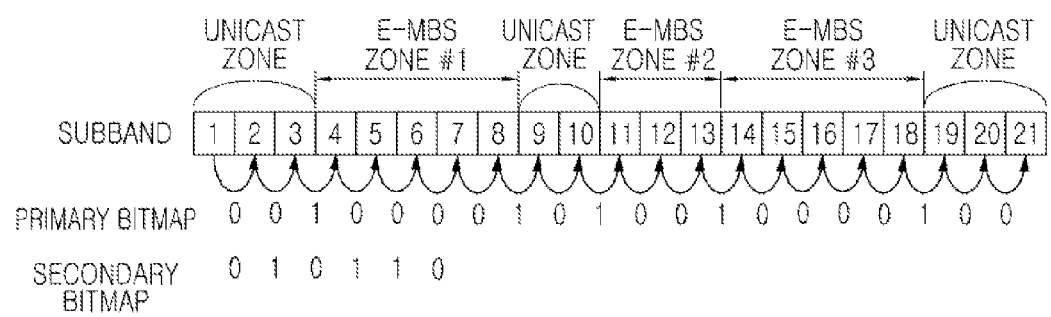
FIG. 10 illustrates a method for generating a dual folding bitmap in an IEEE 802.16m communication system according to an exemplary embodiment of the present invention.

With reference to FIG. 10, a method for generating a dual folding bitmap will be described below.

FIG. 10 illustrates a method for generating a dual folding bitmap in an IEEE 802.16m communication system according to an exemplary embodiment of the present invention.

Referring to FIG. 10, an E-MBS zone is interposed between unicast zones. In this case, resource allocation information about a subframe should be represented using a dual folding bitmap.

The dual folding bitmap includes a primary bitmap and a secondary bitmap. A bit of the primary bitmap is set to, for example, '1', when a zone is changed irrespective of whether the zone is a unicast zone or an E-MBS zone. The primary bitmap may be created in the following manner.

The primary bitmap may be created in the following folding tree scheme.

In the folding tree, if the service zone of subband #(m+1) is identical to the service zone of subband #m at a bit #m node (m is 0 or a larger integer), an edge is drawn in a direction which is opposite to a direction of a previous edge from the bit #m node, and a bit #(m+1) node corresponding to bit #(m+1) of the single folding bitmap is set to a first node value at the end of the edge. The node value of the bit #(m+1) node is equal to the bit value of bit #(m+1).

On the other hand, if the service zone of subband #(m+1) is different from the service zone of subband #m at the bit #m node, an edge is drawn in a direction which is identical to the direction of the previous edge from the bit #m node, and the bit #(m+1) node corresponding to bit #(m+1) of the single folding bitmap is set to a second node value at the end of the edge. The node value of the bit #(m+1) node is equal to the bit value of bit #(m+1).

The secondary bitmap includes information that identifies each service zone allocated in the subframe. The number of bits in the secondary bitmap is equal to the number of service zones defined in the subframe and the bits of the secondary bitmap are mapped to the services zones of the subframe in a one-to-one correspondence. Hence, if the value of a bit is, for example, '0' in the secondary bitmap, this indicates that a service zone corresponding to the bit is a unicast zone. If the value of the bit is, for example, '1' in the secondary bitmap, this indicates that the service zone corresponding to the bit is an E-MBS zone.

Referring to FIG. 10, subband #1, subband #2 and subband #3 are allocated for a unicast zone, subband #4 to subband #8 are allocated for E-MBS zone #1, subband #9 and subband #10 are allocated for a unicast zone, subband #11, subband #12 and subband #13 are allocated for E-MBS zone #2, subband #14 to subband #18 are allocated for E-MBS zone #3, and subband #19, subband #20 and subband #21 are allocated for a unicast zone. Therefore, the primary bitmap is set to [001000010100010000100] and the secondary bitmap is set to [010110].

As described above, upon receipt of the primary bitmap and the secondary bitmap from the BS, MSs can acquire zone configuration information about the subframe using the primary bitmap. However, only the number of zones is known from the primary bitmap and thus the MSs cannot identify whether a zone is an E-MBS zone or a unicast zone using the primary bitmap. Hence, the MSs distinguish E-MBS zones from unicast zones using the secondary bitmap.

In the dual folding bitmap scheme, the bit overhead of the primary bitmap is equal to the bit overhead of the single folding bitmap and the bit overhead of the secondary bitmap is (the number of bits having the value of '1') plus 1. Since the bit overhead of the dual folding bitmap scheme is variable, the dual folding bitmap scheme is more efficient in a system using a control message of a variable size.

An exemplary Configuration message has the format illustrated in Table 4 when an E-MBS zone is interposed between unicast zones in a subframe.

TABLE 4

| Syntax | Size in bits | Description/Notes |
|---|---|---|
| E-MBS Configuration ( ) | | |
| MSI Length | 4 | |
| Primary Folding Bitmap | TBD | |
| | Variable | Indicates the zone configuration. The size is as below. 20 bits for 20 MHz 9 bits for 10 MHz 3 bits for 5 MHz |
| Secondary Folding Bitmap | Variable | Indicates the usage of each zone between unicast and E-MBS. |
| For(Number_of_E-MBS zones) | | |
| ... | | |
| E-MBS Zone ID | 7 | The E-MBS zone ID to which this E-MBS Configuration applies. |
| $I_{size\text{-}offset}$ | 5 | Depends on supported modes, 32 modes assumed as baseline. |
| ... | | |
| Padding | variable | |

In the case where an E-MBS zone is interposed between unicast zones in a subframe, the BS may transmit resource allocation information using the folding bitmap and a Zone Indicator (ZI) instead of the dual folding bitmap scheme. In this case, an exemplary Configuration message has the format illustrated in Table 5.

TABLE 5

| Syntax | Size in bits | Description/Notes |
|---|---|---|
| E-MBS Configuration( ) | | |
| MSI Length | 4 | |
| Folding Bitmap | TBD | |
| | Variable | Indicates the zone configuration. The size is as below. 20 bits for 20 MHz 9 bits for 10 MHz 3 bits for 5 MHz |
| For(Number_of_Zones) | | |
| ZI | 1 | Zone_Indicator. Distinguish between E-MBS zone and unicast zone 0b0: Unicast zone 0b1: E-MBS zone |
| If(ZI == 0b1) | | |
| ... | | |
| E-MBS Zone ID | 7 | The E-MBS zone ID to which this E-MBS Configuration applies. |
| $I_{size\text{-}offset}$ | 5 | Depends on supported modes, 32 modes assumed as baseline. |
| ... | | |
| Padding | variable | |

Referring to Table 5, if a ZI is, for example, '0', a zone corresponding to the ZI is a unicast zone. If the ZI is, for example, '1', the zone corresponding to the ZI is an E-MBS zone.

If a Configuration message has the format illustrated in Table 5, an MS may detect information about resources allocated to a subframe.

Firstly, the MS may determine the number, sizes and positions of zones allocated to the subframe using the single folding bitmap. Secondly, the MS may identify whether each zone is an E-MBS zone or a unicast zone using a ZI included in control information about the zone, that is, a For(Number_of_Zones) syntax. That is, the ZI indicates whether a zone is an E-MBS zone or a unicast zone, like the secondary bitmap.

When the Configuration message format illustrated in Table 5 is used, the number of E-MBS zones allocated to a subframe may be indicated and control information about each E-MBS zone (i.e., E-MBS zone ID and $I_{size\text{-}offset}$ may be expressed, using the secondary bitmap.

Meanwhile, when the Configuration message format illustrated in Table 5 is used, the MS may determine the number of zones allocated to a subframe using the primary bitmap. Since a ZI is included as control information for each zone, the MS may determine whether the zone is an E-MBS zone or a unicast zone. Therefore, the MS can detect control information about each zone, that is, a ZI from the For(Number_of_Zones) syntax and determine whether the zone is an E-MBS zone or a unicast zone according to the value of the ZI.

Figure 11:
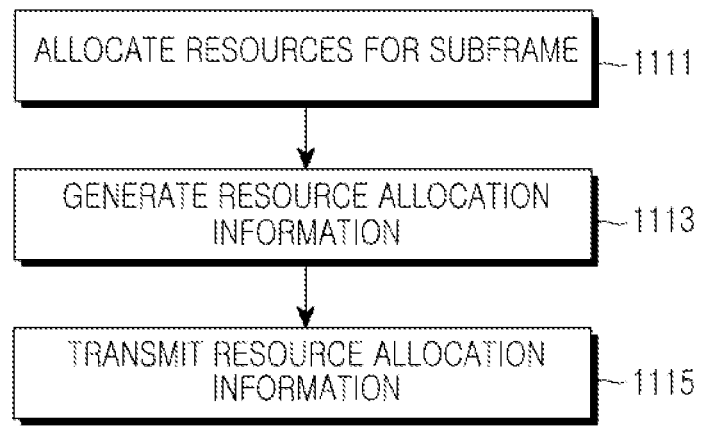
FIG. 11 is a flowchart illustrating an operation of a Base Station (BS) in an IEEE 802.16m communication system according to an exemplary embodiment of the present invention.

With reference to FIG. 11, an operation of a BS in the IEEE 802.16m communication system according to an exemplary embodiment of the present invention will be described below.

FIG. 11 is a flowchart illustrating an operation of a BS in an IEEE 802.16m communication system according to an exemplary embodiment of the present invention.

Referring to FIG. 11, the BS allocates resources of a subframe in step 1111 and generates resource allocation information according to the resource allocation in step 1113. The resource allocation information is generated in the same manner as described above with reference to FIGS. 6A to 10 and Table 1 to Table 5. In step 1115, the BS transmits the resource allocation information to MSs. Since the resource allocation information is transmitted in the same manner as described above with reference to FIGS. 6A to 10 and Table 1 to Table 6, its detailed description is not provided herein.

Figure 12:
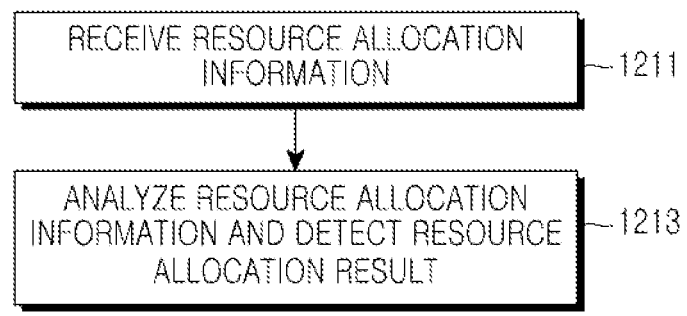
FIG. 12 is a flowchart illustrating an operation of a Mobile Station (MS) in an IEEE 802.16m communication system according to an exemplary embodiment of the present invention.

With reference to FIG. 12, an operation of an MS in the IEEE 802.16m communication system according to an exemplary embodiment of the present invention will be described below.

FIG. 12 is a flowchart illustrating an operation of an MS in an IEEE 802.16m communication system according to an exemplary embodiment of the present invention.

Referring to FIG. 12, the MS receives resource allocation information in step 1211 and detects the result of resource allocation for a subframe by analyzing the resource allocation information in step 1213. The resource allocation information is analyzed in the same manner as described above with reference to FIGS. 6A to 10 and Table 1 to Table 5 and thus its detailed description is not provided herein.

The operation of the MS illustrated in FIG. 12 will be described in greater detail below with reference to FIG. 13.

Figure 13:
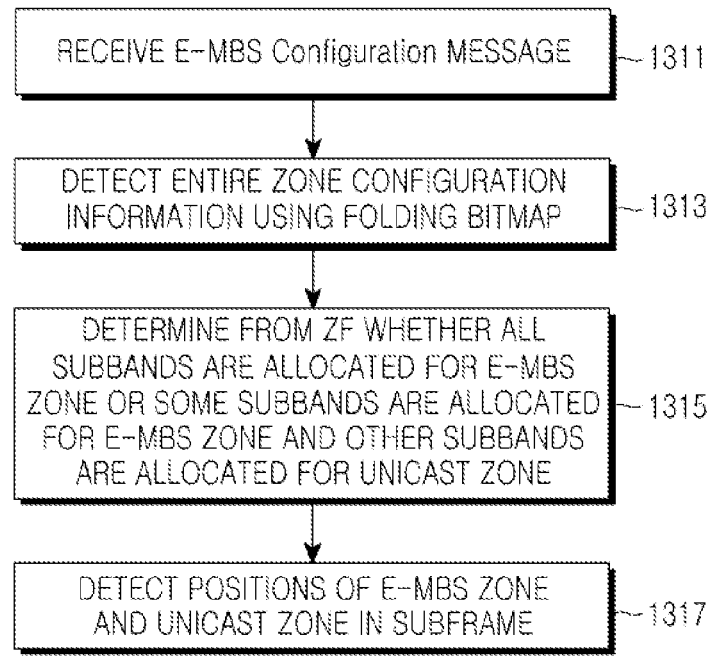
FIG. 13 is a flowchart illustrating an operation of an MS in an IEEE 802.16m communication system according to an exemplary embodiment of the present invention.

FIG. 13 is a flowchart illustrating an operation of an MS in an IEEE 802.16m communication system according to an exemplary embodiment of the present invention.

Referring to FIG. 13, the MS receives an E-MBS Configuration message in step 1311 and detects entire zone configuration information about a subframe using a folding bitmap included in the E-MBS Configuration message in step 1313. In step 1315, the MS determines whether all subbands of the subframe are allocated for E-MBS zones, or some subbands are allocated for an E-MBS zone and other subbands are allocated for a unicast zone, using a ZF. The MS detects the positions of the E-MBS zone and the unicast zone based on all of the zone configuration information and the ZF in step 1317.

Figure 14:
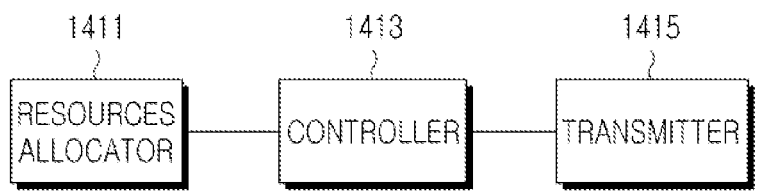
FIG. 14 is a block diagram of a BS in an IEEE 802.16m communication system according to an exemplary embodiment of the present invention.

With reference to FIG. 14, the configuration of a BS in the IEEE 802.16m communication system according to an exemplary embodiment of the present invention will be described below.

FIG. 14 is a block diagram of a BS in an IEEE 802.16m communication system according to an exemplary embodiment of the present invention.

Referring to FIG. 14, the BS includes a resource allocator 1411, a controller 1413, and a transmitter 1415. The controller 1413 provides overall control to the BS. The controller 1413 generates resource allocation information according to the result of resource allocation for a subframe performed by the resource allocator 1411. The resource allocation information is generated in the same manner as described before with reference to FIGS. 6A to 11 and Table 1 to Table 5 and thus its detailed description is not provided herein. The resource allocator 1411 allocates resources on a subframe basis. The resource allocation information generated from the controller 1413 is transmitted to MSs through the transmitter 1415.

While the resource allocator 1411, the controller 1413 and the transmitter 1415 are shown in FIG. 14 to be separately configured in the BS, they may be incorporated into a single block.

Figure 15:
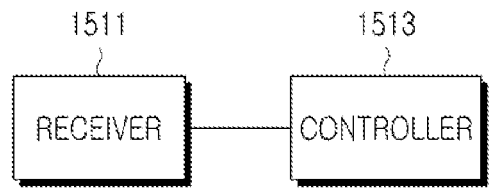
FIG. 15 is a block diagram of an MS in an IEEE 802.16m communication system according to an exemplary embodiment of the present invention.

With reference to FIG. 15, the configuration of an MS in the IEEE 802.16m communication system according to an exemplary embodiment of the present invention will be described below.

FIG. 15 is a block diagram of an MS in an IEEE 802.16m communication system according to an exemplary embodiment of the present invention.

Referring to FIG. 15, the MS includes a receiver 1511 and a controller 1513. The receiver 1511 receives resource allocation information from a BS. The controller 1513 detects the result of resource allocation for a subframe by analyzing the received resource allocation information. The resource allocation information is analyzed in the same manner as described before with reference to FIGS. 6A to 10, FIGS. 12 and 13, and Table 1 to Table 5 and thus its detailed description is not provided herein.

While the receiver 1511 and the controller 1513 are shown in FIG. 15 to be separately configured in the MS, they may be incorporated into a single block.

As is apparent from the above description of exemplary embodiments of the present invention, resource allocation information can be transmitted and received in such a manner that minimizes bit overhead in an IEEE 802.16m communication system. Therefore, the overall system performance of the IEEE 802.16m communication system can be improved.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), Compact Disc (CD)-ROMs, magnetic tapes, floppy disks, and optical data storage devices. The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for transmitting resource allocation information at a base station (BS) in a communication system, the method comprising:

generating, by the BS, resource allocation information including a folding bitmap including zone configuration information related to zones, the folding bitmap being generated using a folding tree, wherein, except for a start node, nodes in the folding tree are mapped to bits included in the folding bitmap in a one-to-one correspondence; and transmitting the resource allocation information to a mobile station (MS).

2. The method of claim 1, wherein the zone configuration information indicates the number, sizes and positions of the zones.

3. The method of claim 1, wherein, if the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

4. The method of claim 1, wherein if a zone index of a zone to which resource unit #(m+1) belongs is identical to a zone index of a zone to which resource unit #m belongs at a bit #m node, where m is 0 or a larger integer, an edge is drawn in a direction which is opposite to a direction of a previous edge from the bit #m node and a bit #(m+1) node corresponding to an $(m+1)^{th}$ bit being bit #(m+1) in the folding bitmap is set to a first node value at an end of the edge drawn in the direction which is opposite to the direction of the previous edge, and if the zone index of the zone to which resource unit #(m+1) belongs is NOT identical to the zone index of the zone to which resource unit #m belongs at the bit #m node, an edge is drawn in a direction which is identical to the direction of the previous edge from the bit #m node and the bit #(m+1) node corresponding to the $(m+1)^{th}$ bit being bit #(m+1) in the folding bitmap is set to a second node value at an end of the edge drawn in the direction which is identical to the direction of the previous edge, and wherein the node value of the bit #(m+1) node is equal to a bit value of bit #(m+1).

5. The method of claim 1, wherein the resource allocation information includes a zone flag (ZF) indicating whether a last zone of the zones is allocated as a first service zone or a second service zone, and wherein the first service zone carries data for a first service, the second service zone carries data for a second service, and each of the first and second services zones includes at least one resource unit.

6. The method of claim 5, wherein the first service is a multicast and broadcast service and the second service is a unicast service.

7. A method for receiving resource allocation information at a mobile station (MS) in a communication system, the method comprising:

receiving, by the MS, resource allocation information generated to include a folding bitmap including zone configuration information related to zones, the folding bitmap being generated using a folding tree, wherein, except for a start node, nodes in the folding tree are mapped to bits included in the folding bitmap in a one-to-one correspondence; and analyzing the received resource allocation information to determine a position of each allocated zone and a total number of zones allocated to a subframe.

8. The method of claim 7, wherein the zone configuration information indicates the number, sizes and positions of the zones.

9. The method of claim 7, wherein, if the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

10. The method of claim 7, wherein if a zone index of a zone to which resource unit #(m+1) belongs is identical to a zone index of a zone to which resource unit #m belongs at a bit #m node, where m is 0 or a larger integer, an edge is drawn in a direction which is opposite to a direction of a previous edge from the bit #m node and a bit #(m+1) node corresponding to an $(m+1)^{th}$ bit being bit #(m+1) in the folding bitmap is set to a first node value at an end of the edge drawn in the direction which is opposite to the direction of the previous edge, and if the zone index of the zone to which resource unit #(m+1) belongs is NOT identical to the zone index of the zone to which resource unit #m belongs at the bit #m node, an edge is drawn in a direction which is identical to the direction of the previous edge from the bit #m node and the bit #(m+1) node corresponding to the $(m+1)^{th}$ bit being bit #(m+1) in the folding bitmap is set to a second node value at an end of the edge drawn in the direction which is identical to the direction of the previous edge, and wherein the node value of the bit #(m+1) node is equal to a bit value of bit #(m+1).

11. The method of claim 7, wherein the resource allocation information includes a zone flag (ZF) indicating whether a last zone of the zones is allocated as a first service zone or a second service zone, and wherein the first service zone carries data for a first service, the second service zone carries data for a second service, and each of the first and second services zones includes at least one resource unit.

12. The method of claim 11, wherein the first service is a multicast and broadcast service and the second service is a unicast service.

13. A base station (BS) in a communication system, the BS comprising:

a generator configured to generate resource allocation information including a folding bitmap including zone configuration information related to zones, the folding bitmap being generated using a folding tree, wherein, except for a start node, nodes in the folding tree are mapped to bits included in the folding bitmap in a one-to-one correspondence; and a transmitter configured to transmit the resource allocation information to a mobile station (MS).

14. The BS of claim 13, wherein the zone configuration information indicates the number, sizes and positions of the zones.

15. The BS of claim 13, wherein, if the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

16. The BS of claim 13, wherein if a zone index of a zone to which resource unit #(m+1) belongs is identical to a zone index of a zone to which resource unit #m belongs at a bit #m node, where m is 0 or a larger integer, an edge is drawn in a direction which is opposite to a direction of a previous edge from the bit #m node and a bit #(m+1) node corresponding to an $(m+1)^{th}$ bit being bit #(m+1) in the folding bitmap is set to a first node value at an end of the edge drawn in the direction which is opposite to the direction of the previous edge, and if the zone index of the zone to which resource unit #(m+1) belongs is NOT identical to the zone index of the zone to which resource unit #m belongs at the bit #m node, an edge is drawn in a direction which is identical to the direction of the previous edge from the bit #m node and the bit #(m+1) node corresponding to the $(m+1)^{th}$ bit being bit #(m+1) in the folding bitmap is set to a second node value at an end of the edge drawn in the direction which is identical to the direction of the previous edge, and wherein the node value of the bit #(m+1) node is equal to a bit value of bit #(m+1).

17. The BS of claim 13, wherein the resource allocation information includes a zone flag (ZF) indicating whether a last zone of the zones is allocated as a first service zone or a second service zone, and wherein the first service zone carries data for a first service, the second service zone carries data for a second service, and each of the first and second services zones includes at least one resource unit.

18. The BS of claim 17, wherein the first service is a multicast and broadcast service and the second service is a unicast service.

19. A mobile station (MS) in a communication system, the MS comprising:

a receiver configured to receive resource allocation information generated to include a folding bitmap including zone configuration information related to zones, the folding bitmap being generated using a folding tree, wherein, except for a start node, nodes in the folding tree are mapped to bits included in the folding bitmap in a one-to-one correspondence; and a controller configured to analyze the received resource allocation information to determine a position of each allocated zone and a total number of zones allocated to a subframe.

20. The MS of claim 19, wherein the zone configuration information indicates the number, sizes and positions of the zones.

21. The MS of claim 19, wherein if the communication system supports a channel bandwidth of 20 MHz, the folding bitmap includes 20 bits, if the communication system supports a channel bandwidth of 10 MHz, the folding bitmap includes 9 bits, and if the communication system supports a channel bandwidth of 5 MHz, the folding bitmap includes 3 bits.

22. The MS of claim 19, wherein if a zone index of a zone to which resource unit #(m+1) belongs is identical to a zone index of a zone to which resource unit #m belongs at a bit #m node, where m is 0 or a larger integer, an edge is drawn in a direction which is opposite to a direction of a previous edge from the bit #m node and a bit #(m+1) node corresponding to an $(m+1)^{th}$ bit being bit #(m+1) in the folding bitmap is set to a first node value at an end of the edge drawn in the direction which is opposite to the direction of the previous edge, and if the zone index of the zone to which resource unit #(m+1) belongs is NOT identical to the zone index of the zone to which resource unit #m belongs at the bit #m node, an edge is drawn in a direction which is identical to the direction of the previous edge from the bit #m node and the bit #(m+1) node corresponding to the $(m+1)^{th}$ bit being bit #(m+1) in the folding bitmap is set to a second node value at an end of the edge drawn in the direction which is identical to the direction of the previous edge, and wherein the node value of the bit #(m+1) node is equal to a bit value of bit #(m+1).

23. The MS of claim 19, wherein the resource allocation information includes a zone flag (ZF) indicating whether a last zone of the zones is allocated as a first service zone or a second service zone, and wherein the first service zone carries data for a first service, the second service zone carries data for a second service, and each of the first and second services zones includes at least one resource unit.

24. The MS of claim 23, wherein the first service is a multicast and broadcast service and the second service is a unicast service.

* * * * *